United States Patent Office

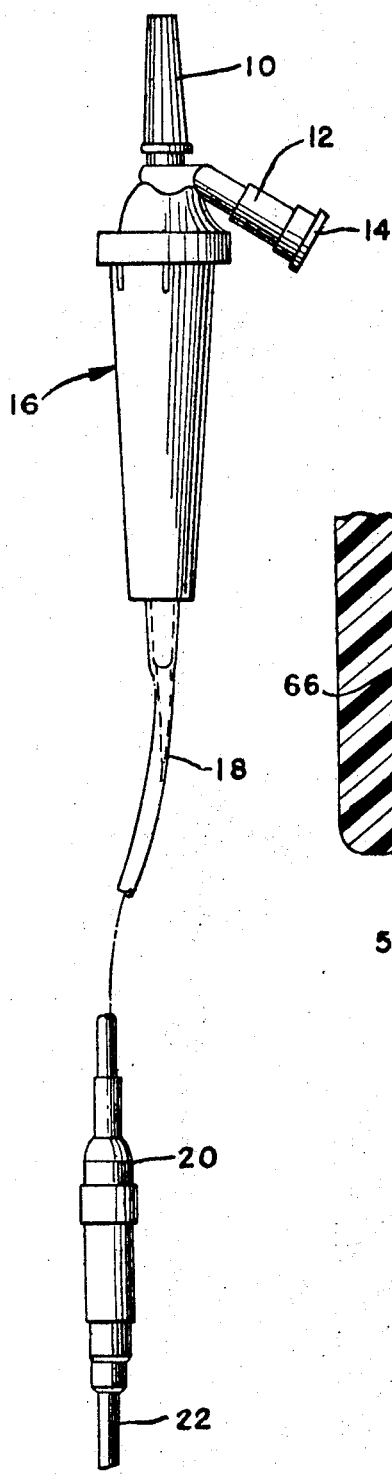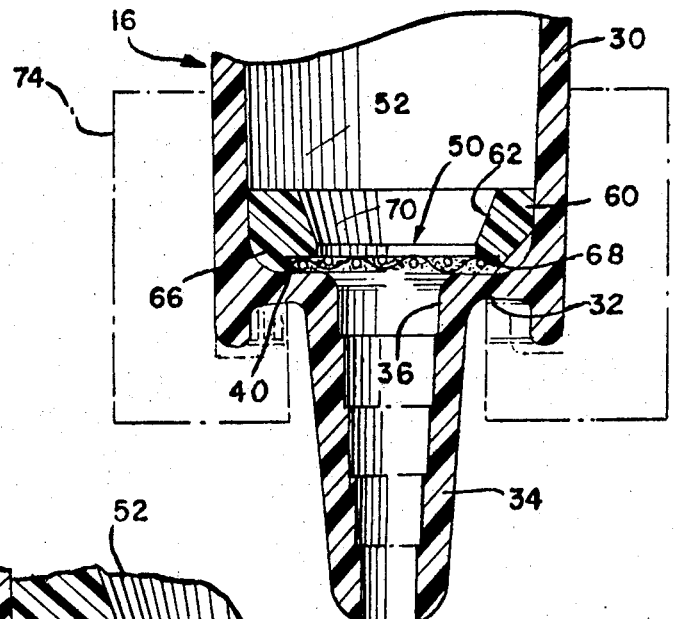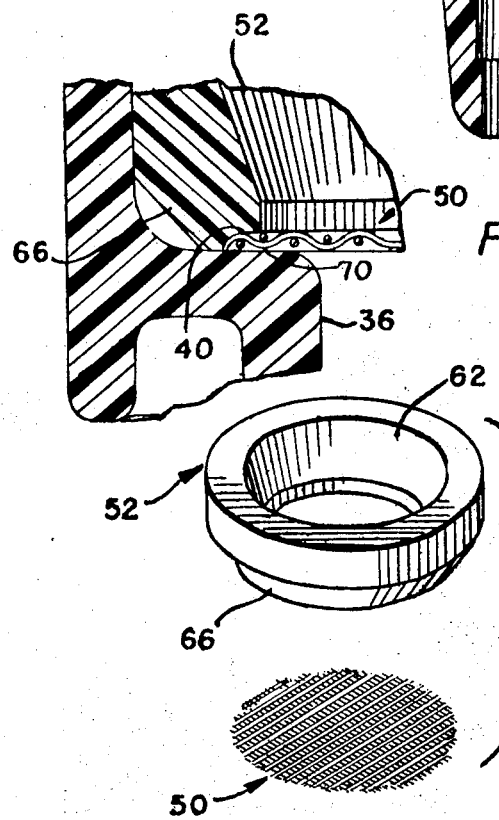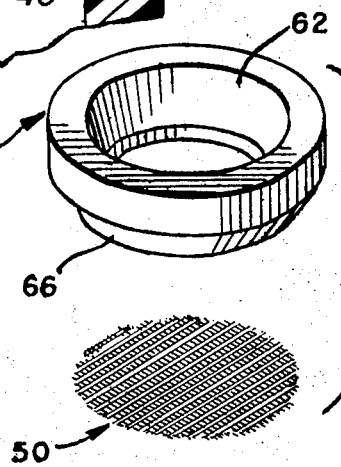

3,806,386
Patented Apr. 23, 1974

3,806,386
INTRAVENOUS INJECTION APPARATUS DRIP CHAMBER HAVING FILTER MEANS AND METHOD OF MAKING SAME
George K. Burke and Kenneth Raines, Bethlehem, Pa., assignors to Burron Medical Products, Inc., Bethlehem, Pa.
Original application Apr. 29, 1970, Ser. No. 32,791, now Patent No. 3,722,697. Divided and this application Feb. 17, 1972, Ser. No. 227,691
Int. Cl. B32b 31/16
U.S. Cl. 156—73                                    1 Claim

ABSTRACT OF THE DISCLOSURE

An intravenous injection apparatus drip chamber comprises a tubular plastic member having a lower wall with an outlet hole formed therethrough and defining an annular shoulder around said outlet hole. A filter means includes a flat metallic filter having raw outer edges which is disposed within a recess in the bottom of a plastic filter ring. The filter ring has a lower tapered portion which is ultrasonically fused to the annular shoulder on the lower wall of the drip chamber. The filter ring is also bonded to the outer periphery of the metallic filter.

---

This is a division of application Ser. No. 32,791, filed Apr. 29, 1970, now Pat. No. 3,722,697.

BACKGROUND OF THE INVENTION

The present invention relates to intravenous injection apparatus for feeding blood or other intravenous solutions into the blood stream of a patient.

It is desirable in many cases to provide a filter means within the drip member of the intravenous injection apparatus, and the present invention is particularly directed to a construction wherein it is desired to employ a metallic filter. Such metallic filters are made by cutting out flat metal disc-like portions from a screen material. Such filters have fine raw edges which are liable to break off and inadvertently flow into a patient's blood stream thereby causing serious problems.

It is accordingly a particular objective of the present invention to provide a construction wherein such metal filters may be effectively employed while eliminating the hazards occasioned by the raw edges provided at the outer periphery of the metal filter.

SUMMARY OF THE INVENTION

In the present invention, the drip chamber comprises a tubular plastic member including a lower wall having a hole formed therethrough and defining an annular shoulder in surrounding relation to said hole. Filter means is disposed adjacent the outlet hole in the lower wall of the drip chamber and includes a flat disc-like metal filter having raw edges.

A plastic filter ring is provided with a recess in the lower portion thereof which receives and surrounds the metallic filter. The filter ring is bonded to the outer periphery of the filter so that the raw edges at the outer periphery of the filter are embedded within the material of the filter ring.

The filter ring is provided with a tapered portion at the lower part thereof adjacent said recess, and this tapered portion is placed in contact with the annular shoulder formed on the lower wall of the drip chamber. The filter ring is then ultrasonically heated and fused to the annular shoulder at said annular portion of the filter ring so as to connect and seal the filter ring to said shoulder throughout an annular area.

In this manner, the filter means is sealed with respect to the lower part of the drip chamber and the fluid passing through the drip chamber is effectively filtered while the fine raw edges of the filter are prevented from breaking off during use.

The method of the present invention enables the drip chamber having filter means therein to be quickly and efficiently made so as to provide an economical product which provides satisfactory operating characteristics.

BRIEF DESCRIPTION OF THE DRAWINGS

FIG. 1 is an elevation partly broken away of an intravenous injection set;
FIG. 2 is a sectional view on an enlarged scale illustrating the manner in which the filter means is connected and sealed to the lower part of the drip chamber;
FIG. 3 is an exploded perspective view showing the filter means of the present invention; and
FIG. 4 is an enlarged view of a portion of the drip chamber and filter means in their finished operative relationship with respect to one another.

DESCRIPTION OF THE PREFERRED EMBODIMENT

Referring now to the drawings wherein like reference characters designate corresponding parts throughout the several views, an intravenous injection set is shown in FIG. 1, including a plastic protector 10 disposed over the piercing device at the upper end of the set. An air inlet filter 12 has a rubber cap 14 disposed over the outer end thereof, and a drip chamber is indicated by reference character 16. The aforementioned components may be of a construction as shown, for example, in U.S. Pat. No. 3,316,908.

A plastic tube 18 is connected to the lower part of the drip chamber and may be provided with a screw type control clamp for controlling the rate of flow through the set. A molded rubber connector 20 serves to connect the lower end of tubing 18 with a needle adapter 22.

Referring now to FIG. 2, the drip chamber is formed of transparent plastic material and is of tubular construction including a substantially cylindrical side wall 30 and a bottom wall 32 which joins with a depending portion 34 having a stepped hole 36 formed therethrough. Hole 36 provides an outlet at the bottom of the drip chamber, and it will be noted that an annular shoulder 40 is defined on the lower wall 32 of the drip chamber in surrounding relationship to the outlet hole.

As seen in FIGS. 2 and 3, the filter means of the present invention includes a filter 50 and a surrounding filter ring 52. Filter 50 comprises a flat disc-like filter preferably formed of metal such as Monel cut out of a screen of 160 x 160 mesh. Cutting of the filter causes the outer periphery thereof to include fine raw edges. While filter 50 is disclosed as preferably formed of a metallic substance, it may be also formed of other relatively rigid substances such as plastic screen or the like.

Filter ring 52 is formed of a suitable plastic material such as clear polystyrene, the filter ring defining a substantially cylindrical outer surface 60 which is adapted to fit relatively snugly within the filter chamber. The filter ring is of annular configuration and has a central hole formed therethrough including an upwardly and outwardly flared portion 62.

The lower outer surface of the filter ring is tapered in a downward direction to define a generally frustoconical outer surface 66, whereby the lower part of the filter ring defines an annular tapered portion which terminates in a relatively sharp annular edge 68 for a purpose hereinafter described. An annular recess 70 is defined in the bottom of the filter ring adjacent the lower tapered portion thereof. This recess is adapted to receive filter 50 as seen in FIG. 2.

In the method of making the drip chamber and filter means of the present invention, the filter is disposed within the recess formed in the filter ring, and the parts are then assembled in the relationship shown in FIG. 2 with the sharp edge 68 of the filter ring resting on annular shoulder 40 defined on the lower wall of the drip chamber. The components are then placed within a suitable ultrasonic heating device 74 which is adapted to ultrasonically heat the components. When the filter ring is ultrasonically heated, the ultrasonic energy will be concentrated at the sharp edge 68, thereby causing the tapered portion of the filter ring to be fused to the adjacent portion of the annular shoulder formed at the bottom of the drip chamber. At the same time, the material of the filter ring will become bonded to the outer periphery of the filter so that the outer raw edges of the filter are embedded in the material of the filter ring as seen most clearly in FIG. 4. It will also be noted that the sharp edge defined at the bottom of the filter ring is flattened somewhat during the fusing process.

As this invention may be embodied in several forms without departing from the spirit or essential characteristics thereof, the present embodiment is therefore illustrative and not restrictive.

What is claimed is:

1. The method of making an intravenous injection drip chamber with filter means therein, comprising, providing an intravenous drip chamber, providing a filter ring with an annular recess in the bottom thereof, forming an annular tapered configuration on said filter ring adjacent said recess which terminates in a relatively sharp annular edge, placing a filter within said annular recess to form a filter ring and filter assembly, disposing said filter and filter ring assembly in the lower part of the intravenous drip chamber with the filter ring in contact with the lower portion of the drip chamber, ultrasonically heating said filter, filter ring, and drip chamber, and concentrating said heat in the annular edge of the tapered portion of said filter ring to fuse the tapered portion of the ring to the lower portion of the drip chamber throughout an annular area thereof, and substantially simultaneously therewith ultarsonically connecting and sealing said filter to the filter ring in said recess.

References Cited
UNITED STATES PATENTS

| | | | |
|---|---|---|---|
| 3,722,697 | 3/1973 | Burke et al. | 210—451 |
| 2,654,097 | 10/1953 | Epstein | 210—451 |
| 3,320,807 | 5/1967 | Taylor | 156—73 |
| 3,401,802 | 9/1968 | Fann | 210—451 |
| 3,602,257 | 8/1971 | Berleyoung | 156—73 |

DOUGLAS J. DRUMMOND, Primary Examiner